United States Patent [19]

Comeau, Jr.

[11] 4,378,786
[45] Apr. 5, 1983

[54] APARTMENT SOLAR HEATING PANEL

[76] Inventor: Joseph E. Comeau, Jr., 24-A Chestnut Sq., Foxboro, Mass. 02035

[21] Appl. No.: 232,910

[22] Filed: Feb. 9, 1981

[51] Int. Cl.³ .............................................. F24J 3/02
[52] U.S. Cl. ................... 126/429; 126/449
[58] Field of Search .............. 126/429, 441, 446, 445, 126/449

[56] References Cited

U.S. PATENT DOCUMENTS

| 4,034,736 | 7/1977 | Telkes | 126/441 |
| 4,100,914 | 7/1978 | Williams | 126/429 |
| 4,154,220 | 5/1979 | Loth | 126/429 |
| 4,287,878 | 9/1981 | Holley et al. | 126/429 |

Primary Examiner—Samuel Scott
Assistant Examiner—G. Anderson

[57] ABSTRACT

A Solar Heating Panel that can be placed in a south facing window with the heat collecting fins facing outside, light will then hit the photovoltaic cells causing the fan to operate, air is drawn into the top of the panel by the fan which blows the air down into the panel and across the heat absorbing fins, as the air passes down across the heat collecting fins it will be heated, and will exit the panel at the bottom of said panel and into the room, thus heating it.

1 Claim, 4 Drawing Figures

APARTMENT SOLAR HEATING PANEL

BACKGROUND OF THE INVENTION

1. Field of the Invention

The invention pertains to the field of Solar Heating Panels. 2. Description of the Prior Art All past Solar Heating Panels needed to be mounted by bolts or brackets to the roof or side of the building, this is a major shortcoming as far as apartment dwellers are concerned, as landlords will not allow bolts or brackets connected to their buildings.

The object of this invention is to provide a Solar Panel that does not need bolts, or brackets to be installed, and is light weight and can be easily installed and moved by one person.

The Williams Solar Energy Collector, U.S. Pat. No. 4,100,914 has been designed to be mounted on the outside of the building, while mine is to be placed on the inside of the building.

The Williams panel has the air output duct right on top of the air input duct. This is a big drawback, because a percentage of the air being exhausted out of the air output duct will be drawn back into the panel through the air input duct before it can circulate through a room, whereas my panel has the air input duct at the top of the panel and the air output duct at the bottom of the panel, which will prevent the reduced air circulation in the room as in Williams, also Williams uses a fan that needs an outside power supply to power the fan, my panel uses Photovoltaic Cells that are a part of the panel to supply power to the fan. The outside power supply in Williams panel renders the panel to an untrue Solar Panel, that is to say the fact that it needs an outside power supply to operate, means that it is drawing power from one source to supply heat to another, that in short is like borrowing from Peter to pay Paul!, therefore the Williams panel is only partly a Solar Panel because of the outside power supply, not to mention the fact that this reduces its energy saving capabilities!, whereas my panel uses Solar Energy as a power supply, this fact makes my panel a true Solar Panel.

The Loth Flat Plate Solar Collector, U.S. Pat. No. 4,154,220 is similar to my panel, but it needs bolts, brackets, etc to be installed, mine does not, also in Williams, Loth requires an outside power supply, therefore the same facts as in Williams apply to Loth.

The Telkes Solar Heating Method, U.S. Pat. No. 4,034,736 makes it clear as to what angle the heat collecting fins should be placed so that they will collect the maximum amount of heat in the winter and the minimum amount in the summer, may panels needs only to be placed in a south facing window in the winter and then removed in the summer to get the same effect as Telkes, also Telkes as in Williams and Loth needs bolts, brackets, etc to be installed, and as in Williams and Loth, Telkes also requires an outside power supply, therefore the same facts as in Williams and Loth apply to Telkes.

The Williams, Loth, and Telkes Solar Panels, as well as other Solar Panels in the past have been designed to heat an entire dwelling, whereas my panel has been designed as a Solar Space Heater and is designed only to heat a part of the dwelling, that is to say its purpose is to supplement the existing heating system, not replace it, as all Solar Panels in the past have been designed to do.

Solar Panels in the past have been designed to be installed on the outside of the building, on the other hand, my panel has been designed to be installed on the inside of the building.

SUMMARY OF INVENTION

The object of this invention is to provide Apartment Dwellers with a way by which they can utilize Solar Energy to heat their apartments.

The panel is to be placed in a south facing window, when this is done, air will be drawn into the top of the panel by the fan, which is powered by Photovoltaic Cells, the air is then forced down into the panel and across the heating fins which are of Aluminum construction, painted flat black so as to absorb the maximum amount of solar heat, as the air passes over these fins it is heated and then exits at the bottom of the panel, thereby heating the room.

Finally the front of the panel will be made of clear plastic so as to make an enclosed space around the fins, also connected to the front of the panel, inside of the panel, at the top and bottom of the panel are air ducts to insure that the air maintains a maximum efficient flow of air across the fins at all times, also these ducts will prevent a build up of back air presure.

This panel enables Apartment Dwellers, Home Owners, Small Offices, etc., to make use of Solar Energy.

DESCRIPTION OF THE PREFERRED EMBODIMENT

Figure 1:
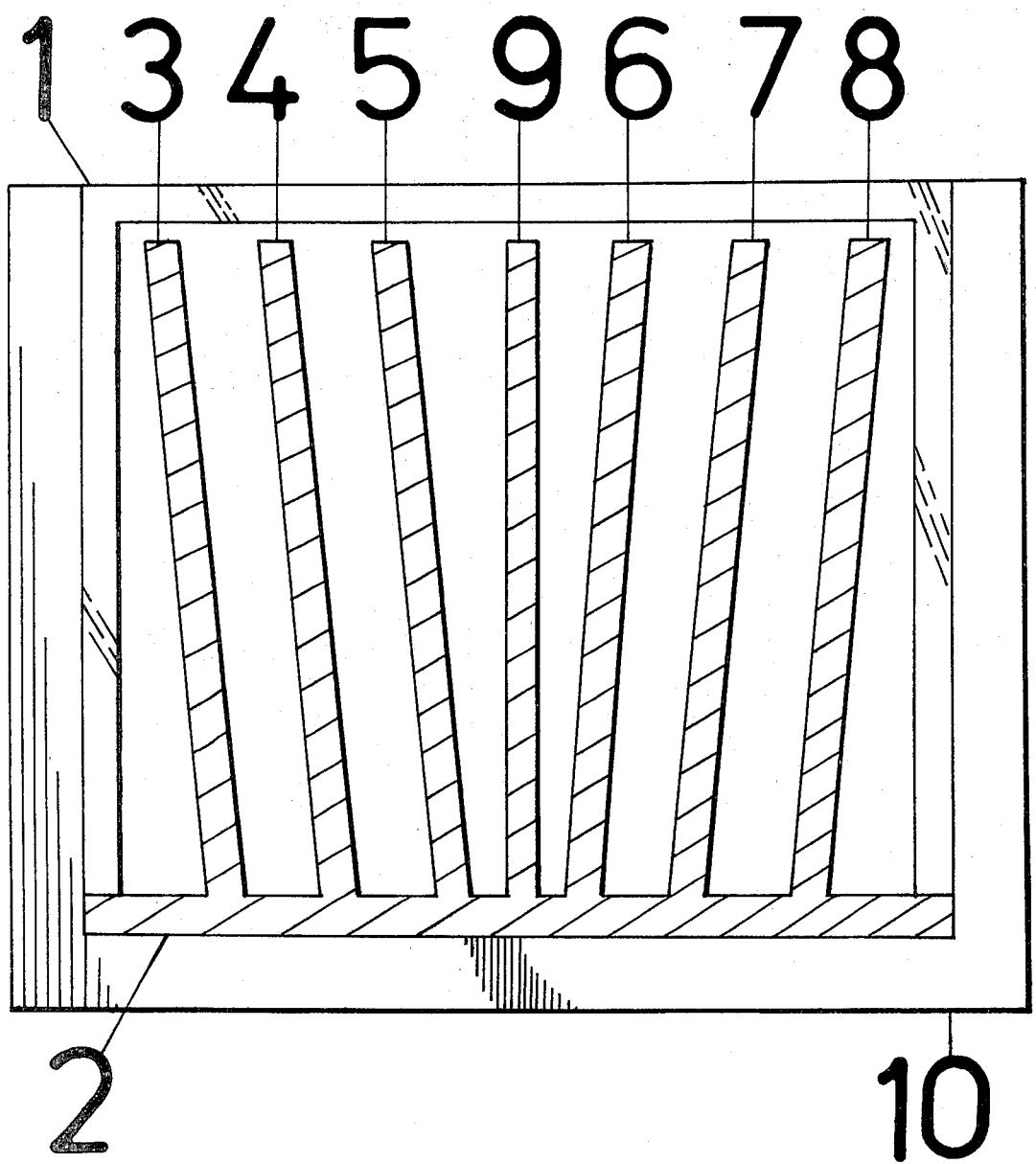
FIG. 1 is a bottom view showing fin detail.

With reference now to the drawings and more particularly to FIG. 1 thereof, there is shown a bottom view of the panel. The front, left, and right sides, 1, are made of a clear plastic and are so formed to create an enclosure around fins 3, 4, 5, 6, 7, 8, and 9. The back of the panel 2, is made of aluminum, also 2, will be the base for fins 3, 4, 5, 6, 7, 8, and 9, said fins and base 2, shall be of one piece construction. Fin 9, shall be placed in the middle of base 2, and shall go from the top to the bottom of base 2. Fins 3, 4, and 5 shall be to the left of fin 9, and evenly spaced from one another, also fins 3, 4, and 5 shall be at an angle, said angle shall be away from fin 9. Fins 6, 7, and 8 shall be to the right of fin 9, and evenly spaced from one another, also fins 6, 7, and 8 shall be at an angle, said angle shall be away from fin 9. Fins 3, 4, 5, 6, 7, and 8 shall also go from the top to the bottom of base 2. A stand 10, for the panel shall extend outward from the left, right, and back bottom of the panel.

Figure 2:
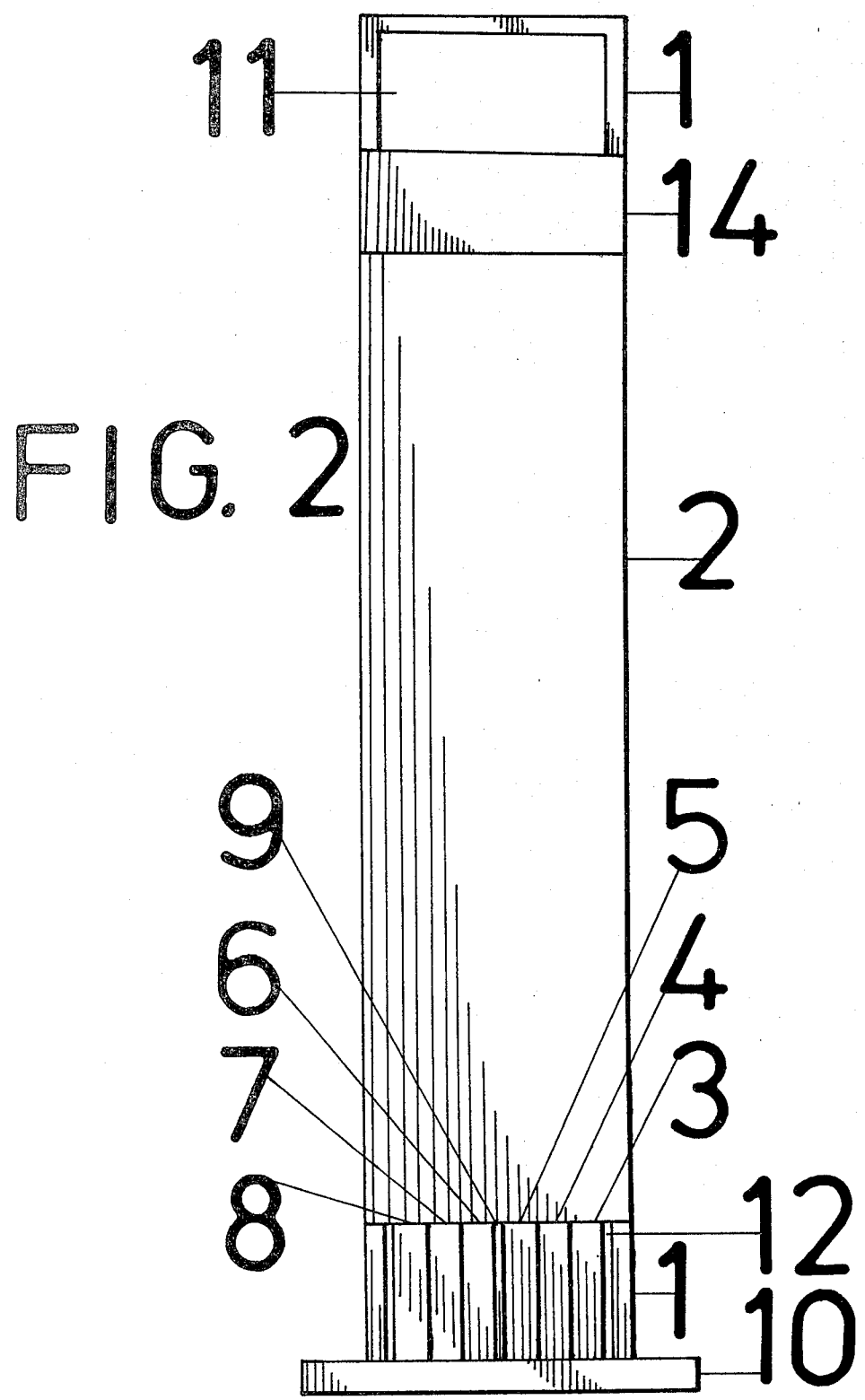
FIG. 2 is a back view showing air input and output vents.

With reference now to FIG. 2 thereof, there is shown a back view of the panel. The air input duct 11, shall be at the top back of the panel, with air duct 14, on the inside of the panel and just below air input duct 11. The air output duct 12, shall be at the bottom of the panel, with the back 2, stopping above the stand 10, to form the top edge of the air output duct 12, while fins 3, 4, 5, 6, 7, 8, and 9 will continue down to the bottom of the panel.

Figure 3:
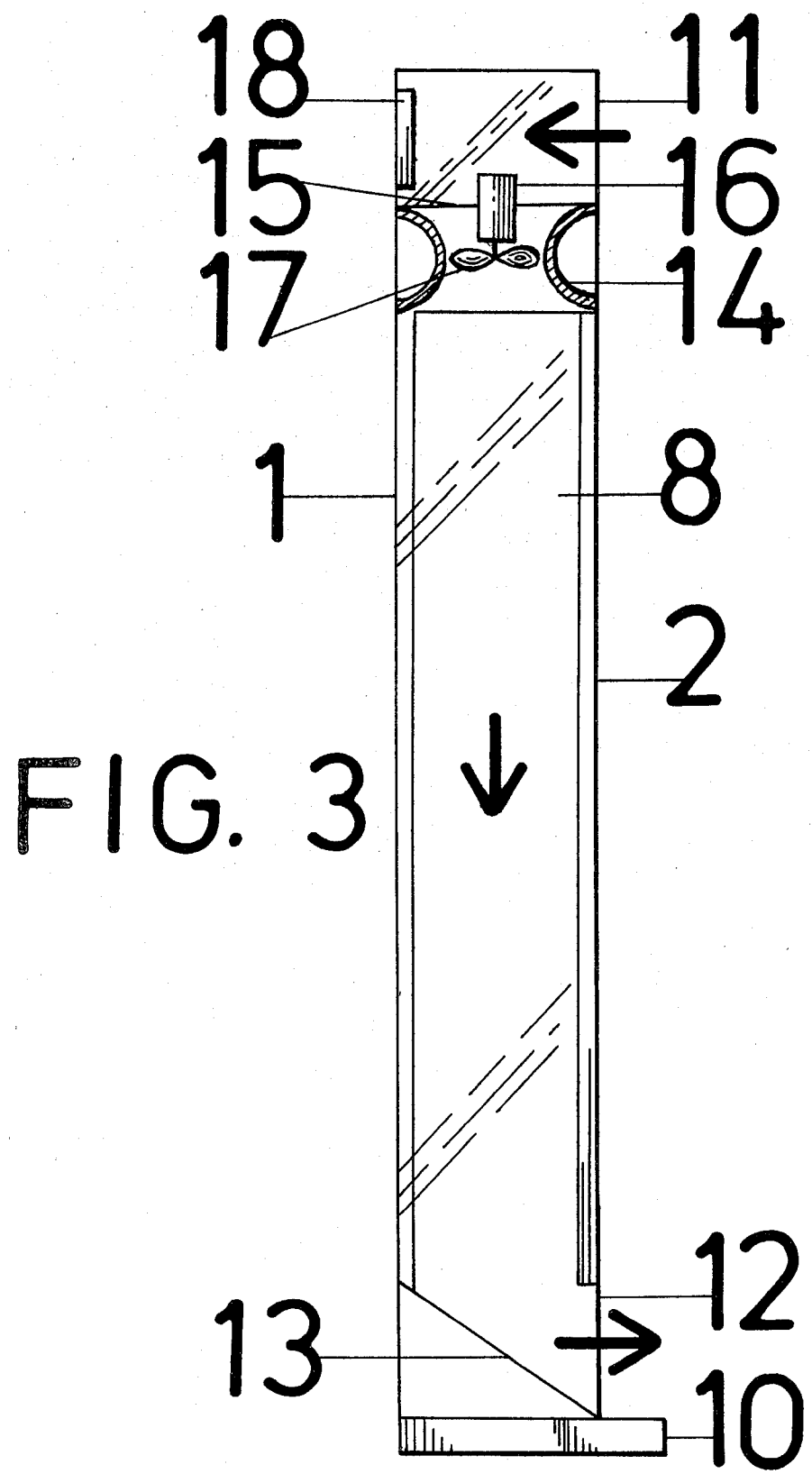
FIG. 3 is a left side view showing placement of the photovoltaic cells, fan, air ducts, and heating fins.

With reference now to FIG. 3 thereof, there is shown an embodiment of the panel from the left side. Photovoltaic Cells 18, shall be on the inside front of the panel, just above bracket 15. Bracket 15, shall be in the shape of a plus sign, with motor 16, mounted in the center of it. Fan blades 17, shall be connected to motor 16, by the motor's shaft, also fan blades 17, shall be in the center of air duct 14. Air duct 14, shall be of a cone type shape that starts at all of the inside sides and gets smaller as it goes down until it reaches the fan blades 17, at which time it gets bigger until it reaches all of the inside sides of the panel. Air deflector 13, shall start at the front of the panel at a point parallel to the top edge of the air output duct 12. Air deflector 13, shall go from the left to the right sides of the inside of the panel, also air deflector 13, shall angle down until it reaches the stand 10. The arrows in FIG. 3 indicate the direction of the air flow.

Figure 4:
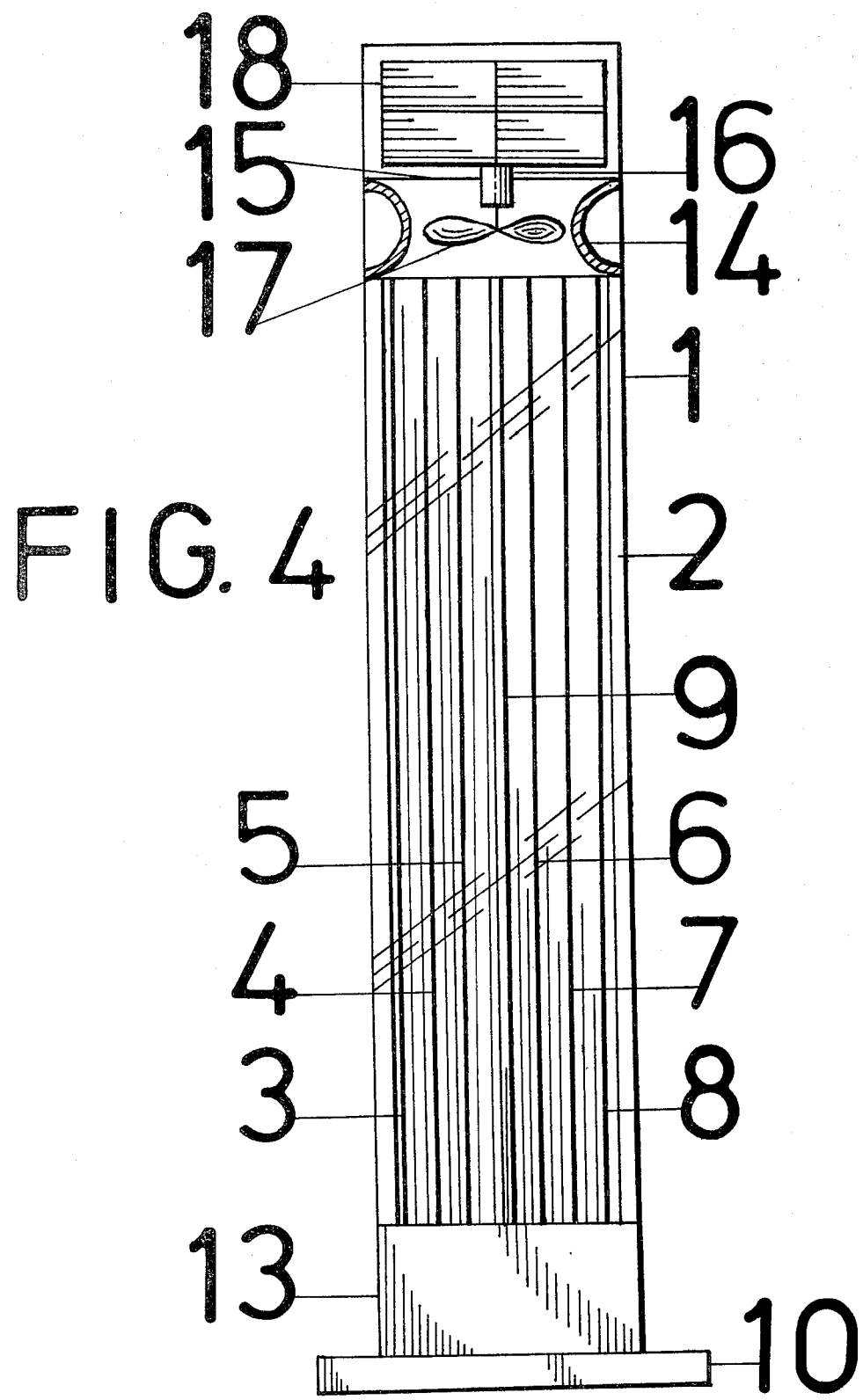
FIG. 4 is a front view showing placement of the photovoltaic cells, fan, and air ducts.

With reference now to FIG. 4 thereof, there is shown an embodiment of the panel from the front. FIG. 4 does not contain any additional parts, but has been drawn to help give a better prospective of the panel, with relationship to FIGS. 1-3.

I claim:

1. A Solar Heating Panel wherein said panel can be placed in a south facing window in order to heat a room, said panel comprising;

a piece of clear plastic that will make up the front, left, right, and top sides of the panel;

a piece of aluminum that will make up the back of said panel, said back is a flat vertical sheet wherein there are at least seven fins rising vertically from the back, three fins that are the closest to said left side shall be at an angle of 80 degrees with respect to said back, another three fins that are the closest to said right side shall be at an angle of 80 degrees with respect to said back, a central degrees with respect to said back, a central fin between the three fins on the left and the three fins on the right and be at an angle of 90 degrees with respect to the back;

said fins shall be painted flat black or be black anodized aluminum so that the air that the fan is pushing across the fins will be heated;

an air input opening at the top back of said panel, so that a fan will draw in the warm air near the ceiling of said room to make it even warmer;

an air output opening at the bottom back of said panel, so that the warm air will be exhausted from said panel into the cooler air near the floor of said room thereby warming said room;

a piece of aluminum that starts at the front bottom of the fins and goes from the left to the right sides, that angles down so that it will end at the bottom back of the fins to create an air deflector in said panel;

a fan having blades located just a few inches below the air input opening at the top back of said panel;

a cone type air duct that starts at all of the inside sides just below the air input duct and gets smaller as it goes down until it reaches the fan blades at which time it gets bigger until it reaches all of the inside sides just above the top of the fins of said panel;

a series of photovoltaic cells at the top front inside of said panel to provide electrical power to the fans motor;

a stand which consists of a flat plate forming the bottom of said panel to stably support panel in an upright position;

said panel shall be of an overall size that will enable one person to carry said panel.

* * * * *